Aug. 4, 1970            A. J. SPISAK            3,522,959

FITTED KEY MEANS USING A MOLDED LINER

Filed Jan. 30, 1968

WITNESSES

Robert G. Baird

E. Strickland

INVENTOR

Andrew J. Spisak,

BY

ATTORNEY

United States Patent Office 3,522,959
Patented Aug. 4, 1970

3,522,959
FITTED KEY MEANS USING A MOLDED LINER
Andrew J. Spisak, Pittsburgh, Pa., assignor to Westinghouse Electric Corporation, Pittsburgh, Pa., a corporation of Pennsylvania
Filed Jan. 30, 1968, Ser. No. 701,709
Int. Cl. B60b 27/06
U.S. Cl. 287—52.05     4 Claims

ABSTRACT OF THE DISCLOSURE

A method of fitting a tapered key in a mating slot by providing a space between the surfaces of the key and the walls of the slot, and filling the space with a high strength, curable laminate, the laminate then being cured with the key in place in the slot. The key is then removed and a drive strip of suitable material is inserted in the slot or disposed along the key surfaces to alter the relative dimensions of the slot and key. The key is then driven tightly into the slot and into the position it occupied when the laminate was cured.

BACKGROUND OF THE INVENTION

Figure 1:
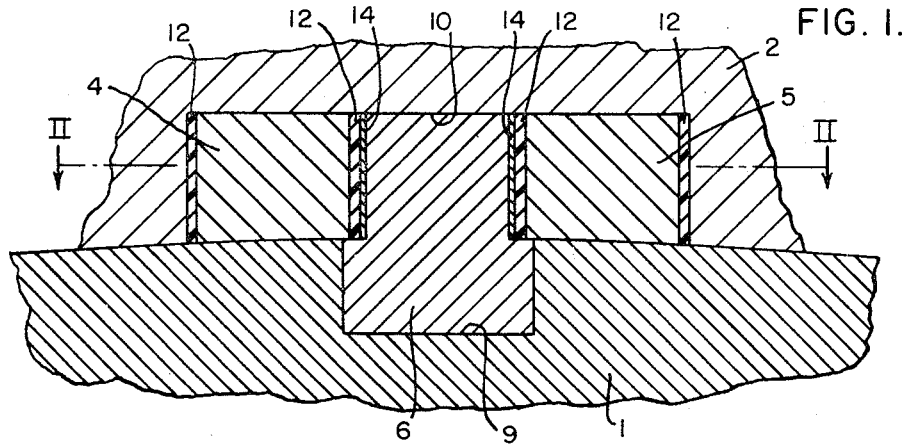

The invention relates to fitted key applications where it is desired to mutually and rigidly engage two mechanical components to prevent relative movement therebetween. The components may be a shaft and a shaft mounted member, for example. The fitted key prevents axial and circumferential movement of the member relative to the shaft.

Generally, a fitted key arrangement includes two or three tapered key pieces disposed side by side in a key slot. At least one of the keys is a drive key adapted to be driven into the slot to tightly wedge the keys therein.

Present methods of fitting such keys are costly and time consuming. Manufacturing tolerances are such that the keys do not fit tightly against their mating surfaces along substantially their entire length. To provide the keys with adequate surface contact, the keys have been hand finished. This is accomplished by first "bluing" the drive key or keys with a suitable marking dye, and then lightly driving the key in place. The key is next withdrawn and the high spots (indicated by the missing dye) are removed by filing or scraping. These steps are repeated until approximately 70 percent of the key surface is in contact with its mating surfaces in the slot, and until the 70 percent contact surface is distributed along the length dimension of the key to insure a uniform and thus reliable fit. The key is then inserted into the slot and driven tight.

BRIEF SUMMARY OF THE INVENTION

The present invention provides a method and arrangement for fitting key pieces without the costly and time consuming processes outlined above while simultaneously providing maximum key surface contact with mating slot surfaces. This is accomplished by first forming the keys or key pieces to have a combined width dimension smaller than that of the slot they are to occupy so that a space is provided between the key surfaces and the walls of the slot. A high strength, uncured or unpolymerized filler material is next placed in the slot to occupy the space. The material is then cured or polymerized wiith the keys in place by using a suitable curing cycle to develop maximum strength in the material. After the material is cured, the keys are withdrawn, and a drive strip, for example a thin strip of copper or brass, is placed in the slot or between the keys. The keys, one of which may be a drive key, are returned to the position they occupied when the material was cured, the drive key being driven into position. The thickness of the drive strip is chosen to insure adequate tightness of the keys in the slot with the drive key driven into position.

In the above briefly described method and arrangement, the uncured filler material is molded to conform to the shape and surface discontinuities or irregularities of the keys so that no hand finishing is required to provide maximum (namely, 100%) key surface contact with the mating surfaces of the slot. The drive strip of material, being adeqately thin, readily conforms to said surface discontinuities.

THE DRAWING

Figure 2:
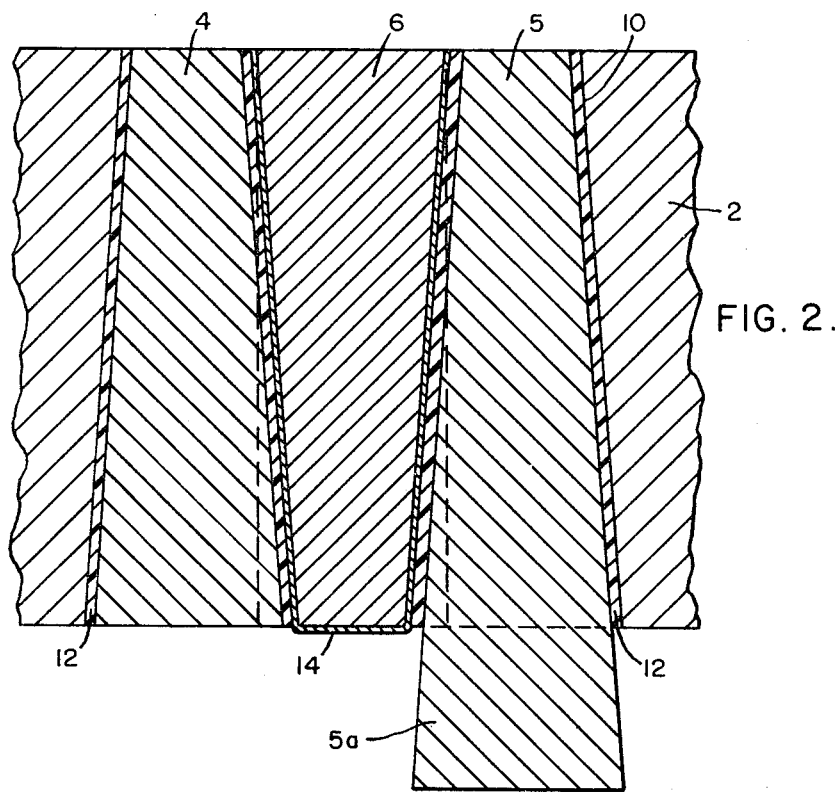

The objects and advantages of the invention will be apparent from the following detailed description taken in connection with the accompanying drawing, in which:

FIG. 1 is a partial cross sectional view of a keying arrangement constructed in accordance with the principles of the present invention; and FIG. 2 is a sectional view of the arrangement of FIG. 1 taken along line II—II.

PREFERRED EMBODIMENT

Specifically, there is shown in FIG. 1 an arrangement for rigidly keying together two mechanical members 1 and 2 which members may be a shaft and a shaft mounted member respectively. The keying arrangement, as shown in the figures, includes a three piece tapered key comprising two outer keys 4 and 5 and a center key 6 disposed in cooperating slots 9 and 10 provided in the members 1 and 2 respectively. The key 5 is shown having a portion 5a extending beyond one side of the member 2 as seen in FIG. 2. The portion 5a may be used to drive the key in place.

The center key or piece 6 is shown having a wide portion extending into the slot 9 and a narrow portion extending into the slot 10 while keys 4 and 5 are completely disposed within the slot 10. Such a key arrangement and configuration is shown only for purposes of illustration, other arrangements and configurations being within the purview of the invention.

As shown in the figures, the key pieces 4, 5 and 6 together, in side by side relation, have a smaller width dimension than the width dimension of the slot 10 in the member 2. The key pieces are purposely sized in this manner to provides a space between the tapered sides of the key pieces adjacent to each other and adjacent the side walls of the slot 10 in member 2 for accommodating a filler material 12 in such a manner that the costly hand finishing operations described above are eliminated.

The filler material 12 is preferably a high strength, low compressible substance after being molded or cured, for example, a resin impregnated glass cloth laminate capable of being polymerized and hardened to maximum strength by use of a suitable curing cycle.

After the keys are sized to provide the accommodating space for the filler material 12, the filler material is disposed to occupy said space. This may be accomplished by fixing strips or layers of the filler material to the tapered sides of the keys by use of a suitable adhesive, for example.

The keys 4, 5 and 6 with the filler material 12 are next fully disposed in the slots 9 and 10, as shown in the figures, and the filler material cured by a suitable curing process in the slots with the keys in place. The filler material forms high strength molded strips or layers (as explained above) within the slot 10 conforming precisely to surface irregularities of the tapered sides of the keys along the entire length thereof.

After the curing process, at least one of the keys 4, 5 or 6 is withdrawn and a thin strip of material 14, for example, a copper or brass strip, is located about a key or keys, or disposed in the slot 10 to narrow slightly the width of the slot opening. In the figures, the strip 14, hereinafter termed a drive strip, is shown disposed between the keys 4, 5 and 6.

To facilitate removal of the keys 4, 5 and 6 from the slots 9 and 10, or to facilitate separation of the center key 6, for example, to locate the drive strip 14 thereabout or in the slot 10, appropriate contact surfaces can be coated with a suitable mold release substance.

After the drive strip 14 is disposed in the slot 10 or about the tapered sides of the center key 6, the keys 4, 5 and 6 are returned to the slots 9 and 10 to the position in which the layers were molded. The width of the slot 10 is however slightly narrowed by virtue of the drive strip as explained above. Thus, one of the keys, say key 6, may be first located in the slot, and the outside keys 4 and 5 driven into place to tightly secure the keys in position, the thickness of the drive strip 14 being chosen to provide a tight fit for the keys in the slots.

After the keys and the layers 12 of the filler material are firmly fixed in place and in the position the layers 12 were molded, the portion 5a of the key 5 may be cut off flush with the side of the member 2 like that of the key 4.

As explained above, the molded layers of filler material 12 are formed to fit precisely the tapered surfaces of the keys 4, 5 and 6 and the mating surfaces of the slot 10 along their entire length dimension. Thus, with the keys returned to the position in the slots 9 and 10 in which the layers were molded, 100 percent of the tapered key surface is fitted to the slot 10 without any of the costly time consuming hand finishing operations described above. This is accomplished by use of a simple and inexpensive molding operation in which a curable, high strength, low deformable filler material is employed to fill spaces provided between the sides of a key or keys and the mating walls of a keying slot.

Though the invention has been described with a certain degree of particularity, changes may be made therein without departing from the spirit and scope of the invention. For example, keying arrangements utilizing more or less than three key pieces may be used to fix the members 1 and 2 together in accordance with the principles of the invention.

I claim as my invention:

1. A method of fitting a tapered key in a mating slot for fitted key applications, the method comprising:

forming the key to have a size that will provide a space between key surfaces and the walls of the mating slot when the key is fully disposed in place therein, occupying said space with an uncured filler material capable of being molded to form a high strength material, curing the material with the key in place, removing the key after the material is cured, locating a thin strip of material to change relatively the width dimensions of the slot and key, and driving the key into the slot against a wedging force created by the changed dimensions, and to the position in which the material was cured.

2. The method described in claim 1 including the additional step of coating the surfaces of the key with a substance effective to facilitate release of the keys after the laminate has been cured.

3. A fitted key arrangement for rigidly engaging and securing together mechanical components, said components having cooperating keying slots, at least one tapered key piece dimensioned to provide a space between the surfaces thereof and the walls of at least one of the keying slots when said key piece is fully disposed therein, a layer of material occupying said space and molded to conform to the shape of said key piece in said slots, a drive strip of material disposed in at least one of said slots adjacent said molded layer, said key piece being disposed in said slots against said strip, and in the position it occupied when layer of material was molded.

4. The arrangement recited in claim 3 in which the material of molded layer comprises a resin impregnated glass cloth laminate.

References Cited

UNITED STATES PATENTS

| | | | |
|---|---|---|---|
| 1,439,769 | 12/1922 | Smith | 287—53 |
| 2,283,348 | 5/1942 | Adams et al. | 287—53 |
| 3,250,553 | 5/1966 | Detwiler | 287—52.05 |

DOUGLAS J. DRUMMOND, Primary Examiner

W. E. HOAG, Assistant Examiner

U.S. Cl. X.R.

156—293